United States Patent [19]

Borzym

[11] Patent Number: 4,631,998
[45] Date of Patent: Dec. 30, 1986

[54] MANDREL APPARATUS

[76] Inventor: Alexander Borzym, 7469 Pebble Point Dr., West Bloomfield, Mich. 48033

[21] Appl. No.: 750,470

[22] Filed: Jul. 1, 1985

[51] Int. Cl.$^4$ .............................................. B23D 21/00
[52] U.S. Cl. ........................................ 83/145; 83/183; 83/184; 83/189
[58] Field of Search ................. 83/145, 183, 184, 186, 83/188–190, 194, 196

[56] References Cited

U.S. PATENT DOCUMENTS

| | | | |
|---|---|---|---|
| 3,089,368 | 5/1963 | Cousino | 83/184 X |
| 3,567,088 | 3/1971 | Anderson | 83/188 X |
| 3,750,505 | 8/1973 | Organ et al. | 83/189 X |
| 3,955,453 | 5/1976 | Carmichael | 83/188 X |
| 4,003,278 | 1/1977 | Shields | 83/186 |

FOREIGN PATENT DOCUMENTS 476104 10/1975 U.S.S.R. ................................ 83/186

Primary Examiner—James M. Meister
Attorney, Agent, or Firm—Krass & Young

[57] ABSTRACT

A mandrel apparatus for a tube cutting machine in which the mandrel apparatus is moved into the open end of the tubing advancing along the feed axis of the tubing as the tubing is moved by the feed means into a cutting position. The mandrel apparatus includes a stop member which is mounted for movement between a stop position in which it is positioned across the tube feed path at a location along the feed axis between a rest position of the mandrel and the cutting station and a clear position in which it is pivoted upwardly clear of the feed path. The mandrel apparatus further includes a stripper member having a stripper surface positioned along the feed axis across the feed path between the stop position of the stop member and the rest position of the mandrel. As the tubing is advanced along the feed axis, the mandrel assembly is moved in the opposite direction along the feed axis to pass the mandrel into the advancing open end of the tubing and move the mandrel to the cutting plane within the tubing whereafter, following cutting of the tubing and movement of the stop member to its clear position, the mandrel assembly is moved toward its rest position to move the trailing edge of the cut tubing clear of the cutting station and move the leading edge of the cut tubing against the stripper surface and strip the cut tubing from the mandrel assembly.

14 Claims, 7 Drawing Figures

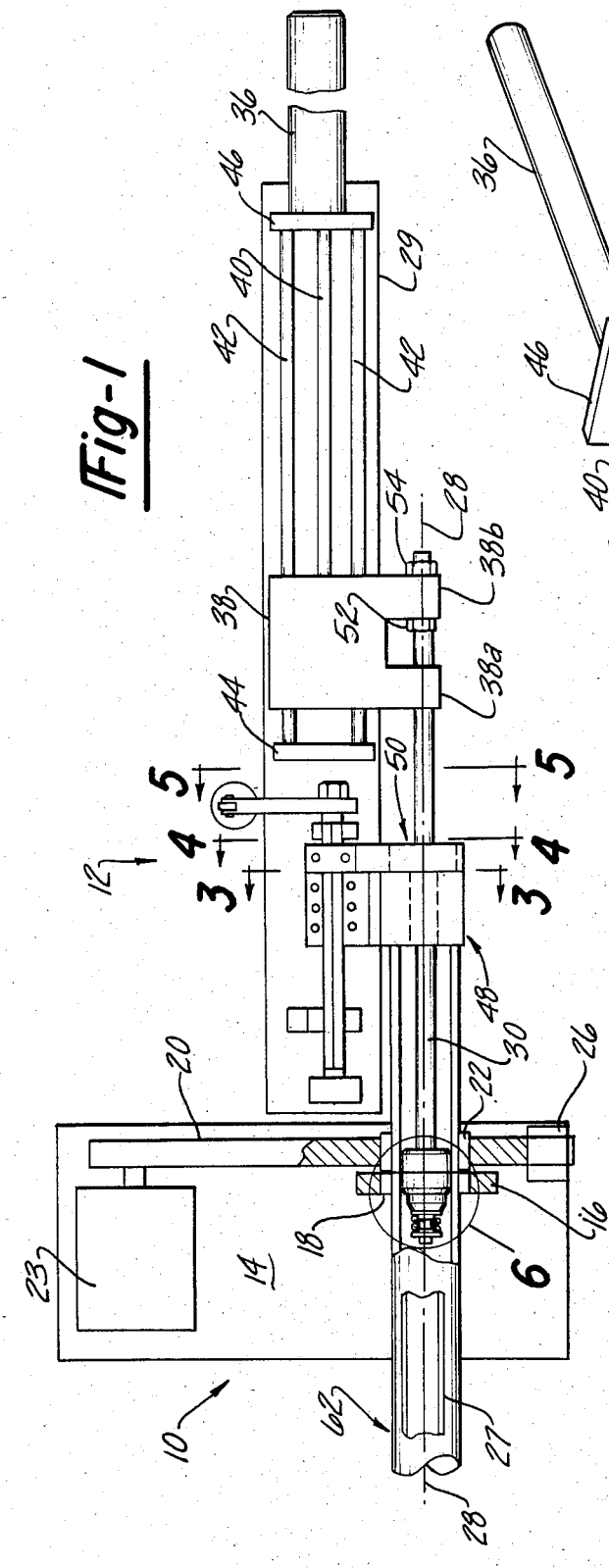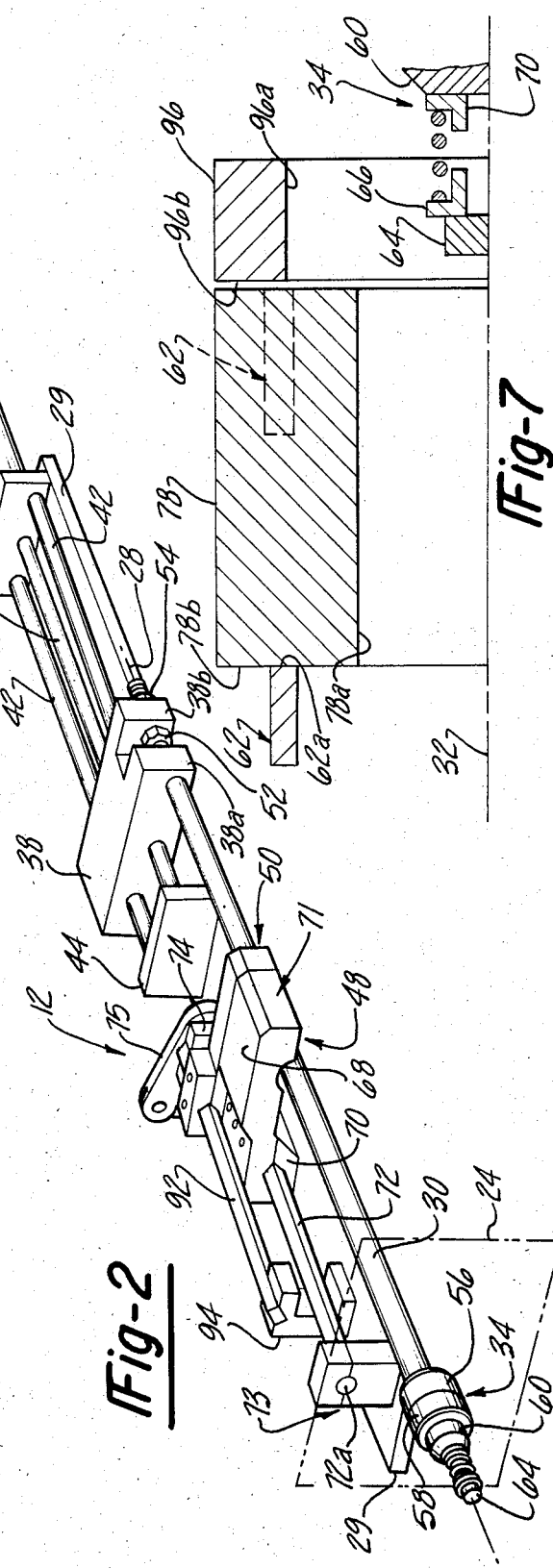

MANDREL APPARATUS

INTRODUCTION

This invention relates to a mandrel apparatus especially suitable for use in cutting tubing.

BACKGROUND ART

Many attempts have been made over the years to produce cutting apparatus that could effectively cut relatively long lengths of tubing into desired shorter lengths. One approach has involved the use of a cutting or pinch roll operating on the same principle as the pipe cutter utilized by plumbers. Another approach has involved the use of a screw machine in which a stationary knife bears against a bar that is rotated. Another approach has involved the use of two aperture dies, initially aligned, one of which is displaced relative to the other at right angles to the axis of the stock to shear the tubing. Another approach has involved the use of a screw type machine in which the tubing is maintained stationary and the knifes are rotated to cut the tubing. All of these prior art devices have the disadvantage that a burr or rough edge or other distortion is formed along the inner periphery of the cut.

In an attempt to avoid such burrs or rough edges, tube cutting systems have been devised in which a mandrel is located down the center of the tubing and fucntions during the cutting operation to minimize distortion along the inner periphery of the cut. While these mandrel systems have in general eliminated or at least alleviated the rough edge along the inner periphery of the cut, they have required an extremely complicated overall cutting apparatus to accommodate the mandrel function and/or have resulted in a significant slowing of the rate of production of tubing by the tube cutting apparatus.

SUMMARY OF THE INVENTION

The present invention is directed to the provision of a tube cutting apparatus which is extremely simply in construction and which yet produces a clean and accurate cut which is devoid of burrs and devoid of distortion of the cut ends. More specifically, the present invention is directed to the provision of a tube cutting apparatus in which a simple mandrel assembly functions to effectively eliminate burrs and distortions at the inner periphery of the cut while not significantly reducing the output rate of the cutting apparatus.

The present invention is intended for use with a tube cutting apparatus of the type including a cutting station, means at the cutting station for cutting tubing generally in a cutting plane, and means defining a feed axis extending through the cutting station generally normal to the cutting plane. According to the invention, feed means are positioned at the entry side of the cutting plane and operate to feed tubing along the feed axis to and through the cutting station for discharge following cutting at the exit side of the cutting plane; a mandrel rod is positioned on the feed axis on the exit side of the cutting plane; plug means are provided on the end of the mandrel rod nearest the cutting plane sized to fit within the tubing; and drive means are provided to move the mandrel rod and plug means reciprocally along the feed axis between a cutting position in which the plug means is positioned at the cutting plane and a ready position in which the plug means is down axis from the cutting plane. With this arrangement, the feed means may function to incrementally feed tubing along the feed axis to and through the cutting plane while the mandrel is moved along the cutting axis in the opposite direction to pass the plug means through the open end of the advancing tubing and position the plug means at the cutting plane within the tubing as the advancing tubing arrives at its stop position corresponding to the desired length of the tubing to be cut.

According to a further feature of the invention, the mandrel apparatus further includes a stop member and a stripper member. The stop member is mounted for movement between a stop position, in which it is positioned across the tube path at a location along the feed axis between the ready position of the plug means and the cutting plane, and a clear position in which it is clear of the tube path. The stripper member includes a stripper surface positioned along the feed axis across the tube path between the stop position of the stop member and the ready position of the plug means. With this arrangement, the tubing may be advanced by the feed means along the axis from the cutting station into engagement at its leading edge with the stop member as the mandrel assembly is moved from its ready to its cutting position to position the plug means at the cutting plane and within the tubing whereafter, following cutting of the tubing and movement of the stop member to its clear position, the mandrel assembly may be moved toward its ready position to move the trailing edge of the cut tubing clear of the cutting station and move the leading edge of the cut tubing against the stripper surface and strip the cut tubing from the mandrel assembly as the mandrel assembly continues its movement to its ready position. This allows the mandrel assembly to reciprocate substantially continuously in timed relationship to the incremental feeding movement of the feed means with the only pause in the reciprocal movement of the mandrel assembly being that required to allow the cutting apparatus to shear the tubing at the cutting plane. The invention mandrel assembly thus provides the advantages of a mandrel arrangement, that is, the elimination of burrs or rough edges on the inner cutting edge, while allowing the cutting apparatus to perform substantially at its maximum output rate.

According to a further feature of the invention, the stop member includes a generally semicircular groove extending axially along its lower face and the stop member is mounted for pivotal movement between its stop and clear positions about an axis generally parallel to but spaced laterally from the feed axis and is pivotally lowered into its stop position to position it over the feed axis with the semicircular groove coaxial with the feed axis. This arrangement allows the stop member to be readily moved into and out of position so as to establish the required cut length of tubing while not interfering with the reciprocal movement of the mandrel assembly and not decreasing the maximum output rate of the cutting apparatus.

According to a further feature of the invention, the stripper member is positioned over the feed axis adjacent to but down axis from the stop position of the stop member and includes a generally semicircular groove extending axially along its lower face and coaxial with the feed axis. This arrangement allows a compact packaging of the total mandrel apparatus.

According to a further feature of the invention, the semicircular groove in the stripper member has a diameter that is greater than the diameter of the plug means but less than the inner diameter of the tubing so that the stripper member may readily pass the mandrel assembly but functions to effectively strip the cut tubing from the mandrel assembly as the mandrel assembly is moved from its cutting to its ready position.

According to a further feature of the invention, the power means for reciprocating the mandrel assembly comprises a power cylinder having a line of action generally parallel to the feed axis and spaced laterally to one side of the feed axis; the power cylinder is positioned down axis from the stripper member; the power cylinder includes a piston head secured to the free end of the piston rod of the cylinder; the mandrel rod is secured to the piston head at a point on the piston head laterally spaced from the point of connection of the piston rod to the piston head; and guide rods extend parallel to the line of action of the power cylinder on either side thereof and slidably pass through the piston head on opposite sides of the piston rod to guide the movement of the piston head and thereby of the mandrel assembly. This arrangement provides a compact, inexpensive, and efficient means of accurately and effectively guiding the reciprocal movement of the mandrel assembly.

According to a further feature of the invention, the plug means carried on the free end of the mandrel rod comprises a pair of annular plug members encircling the mandrel rod and movable radially relative to each other to accommodate the cutting action of the cutting apparatus. This arrangement allows the plug means to accommodate the relative movement occurring during the cutting operation between the fixed and cut sections of tubing and allows the plug means to function to eliminate burring or distortion at the inner periphery of the cut.

BRIEF DESCRIPTION OF THE DRAWINGS

FIG. 1 is a somewhat schematic plan view of a tube cutting machine employing the mandrel apparatus of the invention;

FIG. 2 is a somewhat schematic overall perspective view of the invention mandrel apparatus;

FIG. 7 is a detail view showing the withdrawn position of the mandrel apparatus.

DETAILED DESCRIPTION OF THE PREFERRED EMBODIMENT

Figure 3:
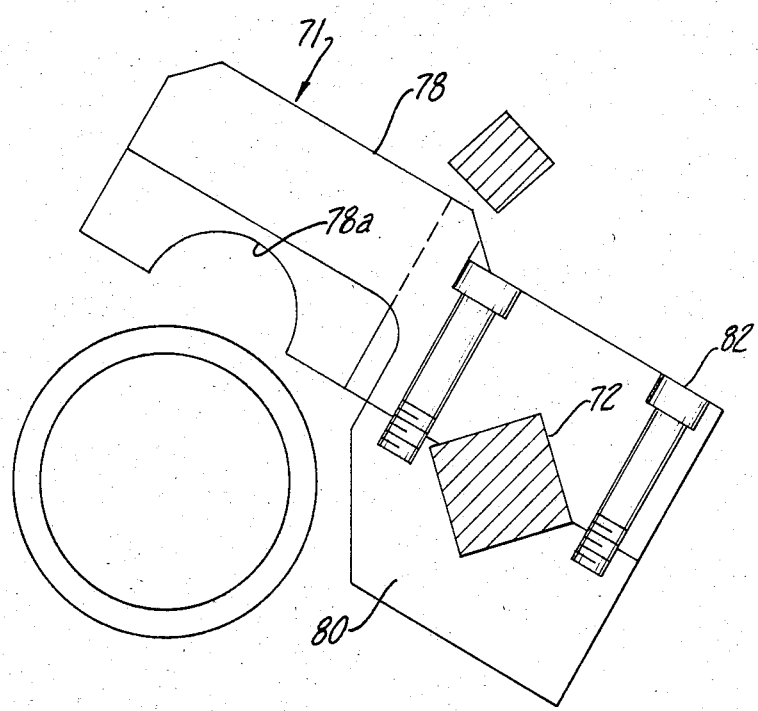
FIGS. 3, 4 and 5 are cross sectional views taken on lines 3—3, 4—4 and 5—5 of FIG. 1.
Figure 4:
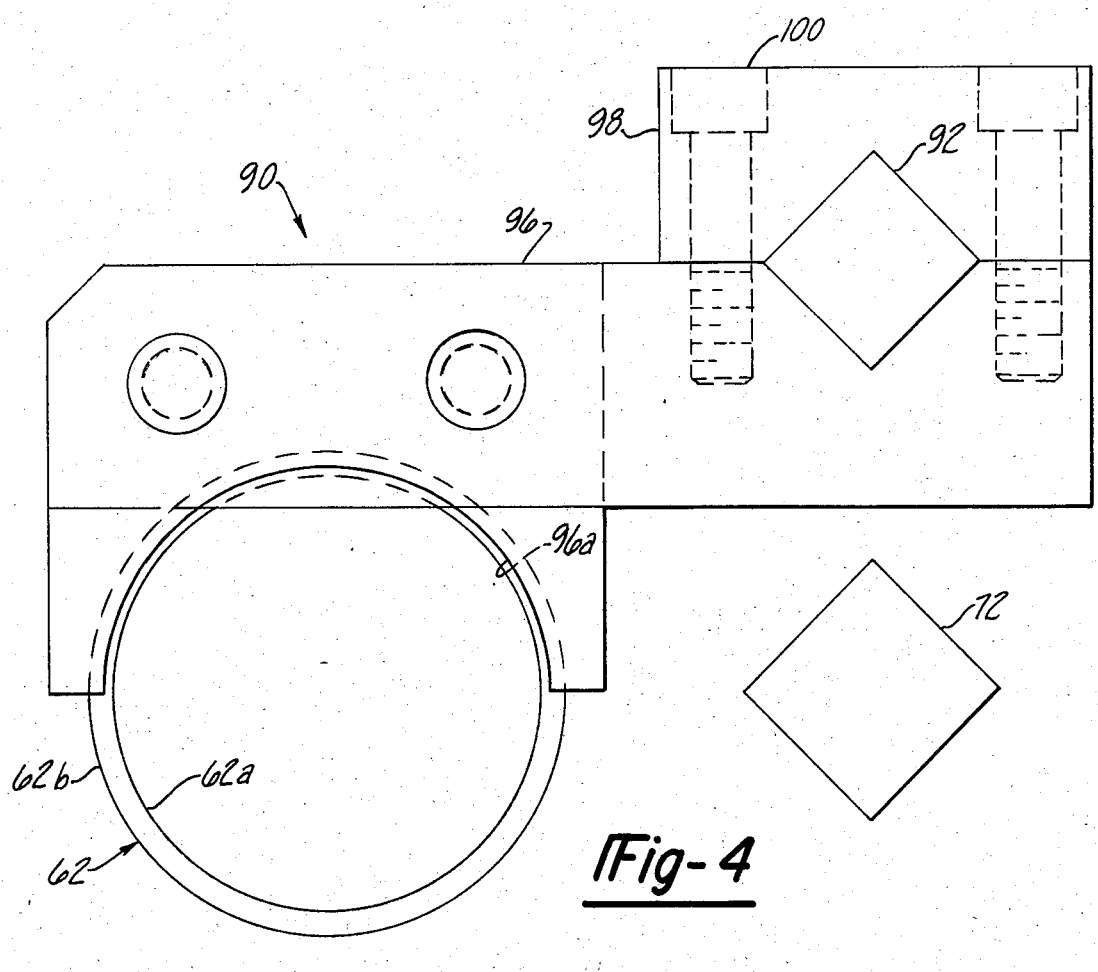
Figure 5:
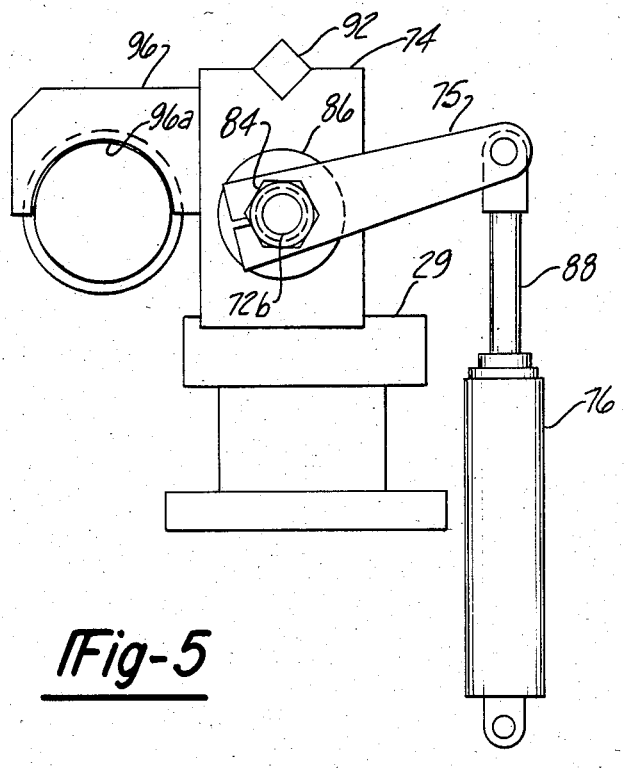
Figure 6:
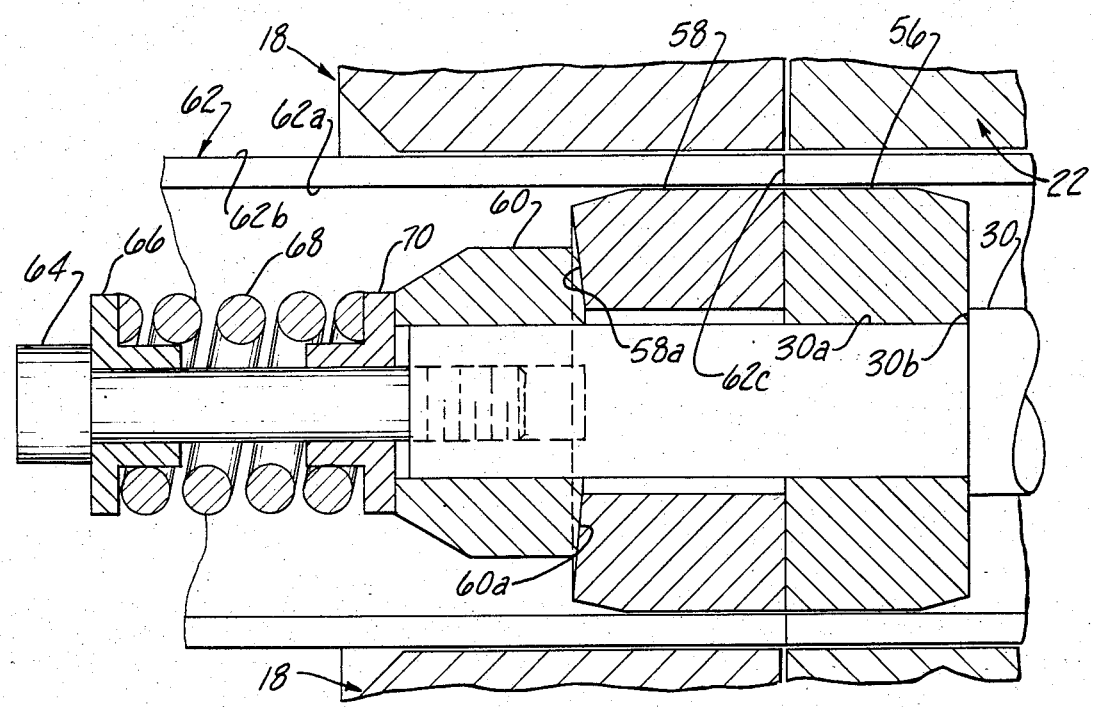
FIG. 6 is a detail view within the Circle 6 of FIG. 1.

The tube cutting machine seen schematically in FIG. 1 includes a tube cutting apparatus seen generally at 10 and a mandrel apparatus seen generally at 12.

Tube cutting apparatus 10 is supported on a suitable support platform 14 and includes a fixed die holder 16 rigidly upstanding from support platform 14 and including a shearing ring 18; a movable die holder 20 in the form of a generally horizontally disposed elongated arm and including a shearing ring 22 carried by the arm; drive means 23 arranged to concentrically and reciprocally move arm 20 to perform a cutting operation at the cutting plane 24 defined between shear rings 18 and 22; guide means 26 suitably mounting the end of arm 20 remote from drive means 23; and feed means 28 operative to feed tubing along a tube feed axis 28. A tube cutting apparatus of the type seen in FIG. 1 is disclosed in further detail in Applicant's copending United Stated patent application Ser. No. 729,928 filed on June 3, 1985.

The invention mandrel apparatus 12 comprises a support platform 29; a mandrel rod 30 positioned along the tube feed axis 28; a plug assembly 34 carried on the end of rod 30 nearest the cutting plane 24; a power cylinder 36 having a line of action parallel to but spaced laterally from the tube feed axis 28; a piston head 38 secured to the free end of the piston rod 40 of power cylinder 36 and slidably guided on guide rods 42 positioned between spaced brackets 44, 46 mounted on support platform 29; a stop member assembly 48; and a stripper member assembly 50.

Mandrel rod 30 is formed of solid bar stock and passes at its end remote from the cutting plane through arm portions 38a and 38b of piston head 38 for securement by nuts 52 and 54 to arm portion 38b.

Plug means 34 includes an annular exit shearing plug 56; and annular entry shearing plug 58; and a collar 60. Exit shearing plug 56 is journalled on reduced diameter portion 30a of mandrel shaft 30 and seats against shaft shoulder 30b. Exit plug 56 has an outer diameter approximating the inner diameter 62a of the tubing 62 to be cut. Entry shearing plug 58 is positioned on shaft portion 30a adjacent exit plug 56 and has an outer diameter approximating the inner diameter 62a of the tubing and an inner diameter greater than the diameter of shaft portion 30a. Collar member 60 is slidably and journalling mounted on rod portion 30a adjacent entry plug 58 and includes an annular cam face 60a for camming coaction with a cam face 58a on entry plug 58. A bolt 64 is threaded into the free end of rod portion 30a and includes a washer 66. A spring 68 is positioned between washer 66 and a thrust washer 70 engaging the free end of collar 60 so that spring 68 biases cam faces 58a and 60a into engagement.

Power cylinder 36 may take various forms and is suitably secured to support bracket 46 upstanding from support platform 29.

Piston head 38 is arranged such that the point of connection of the piston rod 40 of power cylinder 36 is spaced laterally from the point of connection of the mandrel rod 30 to the piston head so that guide rods 42 pass slidably through piston head 38 on opposite sides of piston rod 40. Guide rods 42 thus provide smooth and firm guidance for the piston head and the mandrel assembly throughout the stroke of cylinder 36.

Stop member assembly 48 includes a stop member 71; a square shaft 72; a pedestal 73; a pedestal 74; a crank arm 75; and a cylinder assembly 76.

Stop member 71 includes an arm member 78 and a clamp member 80. Members 78 and 80 are secured together by bolts 82 to clampingly secure the stop member to square shaft 72. A semicircular groove 78a is provided in the lower face of arm member 78. Groove 78a extends axially through arm member 78 and has a diameter greater than that of mandrel rod 30 but less than that of plug members 56, 58.

Pedestal 73 includes upper and lower members suitably clamped together and journalling the round end 72a of shaft 72. The other round end of shaft 72 is journaled in bracket 74. Shaft 72 further includes a threaded end portion 72b for threaded receipt of a nut 84 clamping crank arm 75 against a thrust washer 86. The free end of crank arm 75 is secured to the piston rod 88 of cylinder assembly 76 so that actuation of cylinder 76 pivots shaft 72 about its lengthwise axis and moves stop member 71 between its stop position of FIG. 2, in which it is positioned across the path of tubing 62 with groove 78a coaxial with feed axis 28, and a clear position, seen in FIG. 3, in which it is pivoted upwardly about the axis of shaft 72 to a position clear of the tube path.

Stripper assembly 50 includes a stripper member 90; a square shaft 92; and a pedestal member 94.

Stripper member 90 includes an arm member 96 and a clamp member 98. Clamp member 98 is secured to arm member 96 by bolts 100 to clampingly secure stripper member 90 to square shaft 92. One end of shaft 92 is suitably non-rotatably supported on the upper end of pedestal 94 and the other end of shaft 92 is suitably non-rotatably supported on the upper end of pedestal 74. A semicircular groove 96a is provided in the lower face of arm member 96. Groove 96a extends axially through member 96, is coaxial with tube axis 28, and has a diameter that is greater than the inner diameter 62a of tubing 62 and less than the outer diameter 62b of tubing 62.

In operation, drive means 23 operates to intermittently reciprocate arm 20 in a manner to coact with fixed die holder 16 to shear the tubing positioned within the shearing rings 18, 22 at the cutting plane 24, and feed means 27 is actuated intermittently in synchronism with the action of drive means 23 to feed tube 60 intermittently to the cutting station for cutting by the shearing rings 18, 22. As the feed means 27 is operated during the pause between successive cutting operations of rings 18 and 22 to advance the tubing through the cutting station and along feed axis 28 at the exit side of the cutting station, power cylinder 36 is actuated in synchronism with feed means 27 to advance plug means 34 from the ready or withdrawn position seen in FIG. 7, in which the plug means is withdrawn to a position just down axis from the stripper surface 96b of stripper arm 96, toward the cutting position seen in FIG. 1, in which the interface between plugs 56 and 58 lies in cutting plane 24. As the plug means 34 begins its movement along axis 28 toward the cutting station, stop arm 78 is in its raised position so as to allow passage of plug means 34. As soon as plug means 34 clears the location of stop arm 76, the arm is lowered to its stop position by cylinder 36 behind the advancing plug means.

As the plug means continues its advance along feed axis 28 toward the cutting station, it enters the open end of the tube 62 advancing along axis 28 in the opposite direction and moves within the tube to the cutting position at the cutting station. As the plug means arrives at the cutting station, the leading edge 62d of the tube engages a stop surface 78b on stop arm 78 to provide a stop for the advancing tubing and determine the length of tubing to be cut. As soon as the plug means 34 arrives at the cutting station and the leading edge of the tubing moves into engagement with stop surface 78b, drive means 23 operates to reciprocate arm 20 to perform a shearing operation on the tube at the cutting plane 24. As soon as the cutting operation is completed, arm 20 and feed means 27 remain momentarily quiescent while stop arm 78 is raised and plug means 24 is withdrawn along axis 28 toward its ready position of FIG. 7. As plug means 24 withdraws along axis 28, it moves the trailing edge 62c of the cut length of tubing out of the cutting station to a position clear of shearing ring 22 and support platform 14 whereafter, with continued withdrawing movement of plug means 34 along axis 28, the leading edge 62d of the cut length of tubing engaged stripper surface 96b on stripper arm 96 whereafter, as the plug means 34 continues its withdrawing movement along axis 28 to its ready position of FIG. 7, the cut length of tubing is stripped from the mandrel apparatus for downward gravity discharge into a suitable discharge or collection facility. The apparatus is now ready for another cutting cycle. The length of the tubing sections to be cut is readily adjusted by selective movement of stop assembly 48 and stripper assembly 50 along shafts 72 and 92.

The invention cutting apparatus, including the invention mandrel apparatus, will be seen to provide a means of cutting tubing in a manner that avoids burrs or distortions at the inner surface of the cut and which allows the cutting apparatus to operate substantially at full output speed. Specifically, the mandrel assembly is reciprocated on a substantially continuous basis in synchronism with the incremental feeding movement of the feed means 27 so that the limit on the output of the cutting apparatus is generally determined by the speed of the feed means 27 and the speed of the actual cutting operation and the output limit of the apparatus is not significantly reduced by the addition of the invention mandrel apparatus. In effect, therefore, the invention mandrel apparatus allows the use of a mandrel, with consequent improvement in the quality of the tubing cut, without sacrificing any output capacity of the cutting apparatus.

Whereas a preferred embodiment of the invention has been illustrated and described in detail in will be apparent that various changes may be made in the disclosed embodiment without departing from the scope or spirit of the invention.

I claim:

1. A mandrel apparatus for use with a tube cutting machine of the type including a tube cutting station and feed means for feeding the tubing to be cut incrementally along a feed axis to and through the cutting station, said mandrel apparatus being adapted to be positioned at the exit side of the cutting station and including:

A. a mandrel assembly comprising:
   (1) a mandrel rod positioned along said feed axis, and
   (2) plug means carried on the end of said rod nearest the cutting station and sized to fit within the tubing;

B. power means engaging the other end of said mandrel rod and operative to move said mandrel assembly along said axis between a cutting position in which said plug means is positioned at the cutting plane of the cutting station and a ready position in which the plug means is positioned down axis from the cutting station;

C. a stop member mounted for movement between:
   (1) a stop position in which it is positioned across the tube path at a location along said feed axis between the ready position of said plug means and the cutting station, and
   (2) a clear position in which it is clear of said path; and D. a stripper member having a stripper surface positioned along said feed axis across said path down axis from said stop position of said stop member but no further down axis than said ready position of said plug assembly, whereby the tubing may be advanced by the feed means along said axis from the cutting station into engagement at its leading edge with said stop member as said mandrel assembly is moved from its ready to its cutting position to position said plug means at the cutting plane and within the tubing whereafter, following cutting of the tubing and movement of said stop member to its clear position, said mandrel assembly may be moved toward its ready position to move the trailing edge of the cut tubing clear of the cutting station and move the leading edge of the cut tubing against said stripper surface and strip said cut tubing from said mandrel assembly as said mandrel assembly continues its movement to its ready position.

2. A mandrel apparatus according to claim 1 wherein:
E. said stop member includes a generally semicircular groove extending axially along its lower face; and
F. said stop member is mounted for pivotal movement between said stop and clear positions about an axis generally parallel to but spaced laterally from said feed axis and is pivotally lowered into its stop position to position it over said feed axis with said semicircular groove coaxial with said feed axis.

3. A mandrel apparatus according to claim 2 wherein:
G. said stripper member is positioned over said feed axis adjacent to but down axis from the stop position of said stop member and includes a generally semicircular groove extending axially along its lower face and coaxial with said feed axis.

4. A mandrel apparatus according to claim 3 wherein:
H. said semicircular grooves each have a diameter that is greater than the diameter of said mandrel rod and less than the outer diameter of the tubing to be cut.

5. A mandrel apparatus according to claim 4 wherein:
I. said semicircular groove in said stop member has a diameter that is less than the diameter of said plug means; and
J. said semicircular groove in said stripper member has a diameter that is greater than the diameter of said plug means.

6. A mandrel apparatus according to claim 1 wherein:
E. said power means comprises a power cylinder having a line of action generally parallel to said feed axis.

7. A mandrel apparatus according to claim 6 wherein:
F. said line of action is spaced laterally to one side of said feed axis and said power cylinder is positioned down axis from said stripper member;
G. said power cylinder includes a piston head secured to the free end of the piston rod of said power cylinder; and
H. said mandrel rod is secured to said piston head at a point on said piston head laterally spaced from the point of connection of said piston rod to said piston head.

8. A mandrel apparatus according to claim 7 wherein:
I. guide rods extend parallel to said line of action on either side thereof and slidably pass through said piston head on opposite sides of said piston rod to guide the movement of said piston head and thereby of said mandrel assembly.

9. A mandrel apparatus according to claim 8 wherein:
J. said stop member is mounted for pivotal movement between its stop and clear positions about an axis that is spaced laterally to said one side of said feed axis.

10. A mandrel apparatus according to claim 1 wherein:
E. said plug means comprises a pair of separate plugs carried on the free end of said mandrel rod and movable radially relative to each other to accommodate the cutting operation of the tube cutting machine.

11. A tube cutting apparatus comprising:
A. means defining a cutting station;
B. means at said cutting station operative to cut tubing generally in a cutting plane;
C. means defning a feed axis extending through said cutting station generally normal to said cutting plane;
D. feed means positioned at the entry side of said cutting plane;
E. stop means operative to establish the length of the tubing to be cut; and
F. a mandrel apparatus positioned at the exit side of said cutting plane and including:
(1) a mandrel rod positioned along said feed axis,
(2) a pair of separate annular plugs carried on the end of said mandrel rod and movable radially relative to each other to accommodate the cutting operation of the tube cutting apparatus,
(3) means mounting said rod and said plugs for movement along said feed axis between a cutting position in which the interface between said plugs is positioned in said cutting plane and a ready position in which said plugs are positioned down axis from said cutting plane, and
(4) drive means engaging the other end of said rod and operative to move said rod and said plugs up axis from said ready position to said cutting position, said plugs each having an external diameter less than the internal diameter of the tubing so that said plugs may move telescopically into the open leading end of the advancing tubing to a position totally within the tubing as said feed means moves the tubing down axis from said cutting plane, said feed means and said stop means coacting during up axis movement of said rod and plugs to move the leading end of the tubing to a position, down axis from said cutting plane, in which said plugs and the leading end portion of said rod are received within the tubing.

12. A tube cutting apparatus according to claim 11 wherein:
G. said stop means comprises a stop member having a stop position in which it is positioned across the tube path at a location along said axis between the ready position of said plugs and said cutting plane and operates to intercept the leading edge of the advancing tubing to establish the length of the tubing to be cut.

13. A tube cutting apparatus comprising:
A. means defining a cutting station;
B. means at said cutting station for cutting tubing generally in a cutting plane;
C. means defining a feed axis extending through said cutting station generally normal to said plane;
D. feed means positioned at the entry side of said cutting plane and operative to feed tubing along said feed axis to and through said cutting station for discharge following cutting at the exit side of said cutting plane;
E. stop means operative to establish the length of tubing to be cut;
F. a mandrel rod positioned along said feed axis at the exit side of said cutting plane;
G. plug means on the end of said mandrel rod nearest said cutting plane having an external diameter less than the internal diameter of the tubing so as to fit telescopically and slidably within the tubing; and H. drive means operative to move said mandrel rod and plug means reciprocally along said feed axis from a cutting position in which said plug means is positioned at said cutting plane and a ready position in which said plug means is down axis from said cutting plane;

I. said feed means, said stop means, and said drive means coacting to move said mandrel rod and plug means from said ready position to said cutting position as the tubing is fed through the cutting station to a position at the exit side of the cutting plane as established by said stop means, said plug means telescopically entering the open end of the advancing tubing and moving slidably and telescopically within the tubing to said cutting position to position the plug means and the leading end portion of said mandrel rod within the tubing.

14. A tube cutting apparatus comprising:

A. means defining a cutting station;

B. means at said cutting station operative to cut tubing generally in a cutting plane;

C. means defining a feed axis extending through said cutting station generally normal to said cutting plane;

D. feed means positioned at the entry side of said cutting plane; and

E. a mandrel apparatus positioned at the exit side of said cutting plane and including:
  (1) plug means sized to fit within the tubing and mounted for movement along said feed axis between a cutting position generally at said cutting plane and a ready position down axis from said cutting plane,
  (2) means operative to move said plug means up axis from said ready position to said cutting position and into the open leading end of the advancing tubing as said feed means moves the tubing down axis from said cutting plane,
  (3) a stop member mounted for movement between a clear position in which it is clear of the tube path and a stop position in which it is positioned across the tube path at a location along said axis between the ready position of said plug means and said cutting plane and operates to intercept the leading edge of the advancing tubing to establish the length of the tubing to be cut, and
  (4) a stripper member having a stripper surface along said feed axis across said tube path down axis from said stop position of said stop member but no further down axis than said ready position of said plug assembly.

* * * * *